United States Patent
Shirata (10) Patent No.: US 9,589,584 B2
(45) Date of Patent: *Mar. 7, 2017

(54) MAGNETIC POWDER FOR MAGNETIC RECORDING, MAGNETIC RECORDING MEDIUM, AND METHOD OF MANUFACTURING MAGNETIC POWDER FOR MAGNETIC RECORDING

(71) Applicant: FUJIFILM Corporation, Minato-ku, Tokyo (JP)

(72) Inventor: Masashi Shirata, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 11 days.

This patent is subject to a terminal disclaimer.

(21) Appl. No.: 14/584,568

(22) Filed: Dec. 29, 2014

(65) Prior Publication Data

US 2015/0187380 A1 Jul. 2, 2015

(30) Foreign Application Priority Data

Dec. 27, 2013 (JP) ................. 2013-272726

(51) Int. Cl.
| | |
|---|---|
| *G11B 5/708* | (2006.01) |
| *G11B 5/706* | (2006.01) |
| *C01G 49/00* | (2006.01) |
| *H01F 1/11* | (2006.01) |
| *H01F 1/113* | (2006.01) |

(52) U.S. Cl.
CPC ...... *G11B 5/70678* (2013.01); *C01G 49/0036* (2013.01); *H01F 1/11* (2013.01); *C01P 2002/50* (2013.01); *C01P 2002/52* (2013.01); *C01P 2002/54* (2013.01); *C01P 2002/72* (2013.01); *C01P 2004/64* (2013.01); *C01P 2004/84* (2013.01); *C01P 2006/42* (2013.01); *H01F 1/113* (2013.01); *Y10T 428/2982* (2015.01)

(58) Field of Classification Search
None
See application file for complete search history.

(56) References Cited

U.S. PATENT DOCUMENTS

| | | | |
|---|---|---|---|
| 5,433,878 A | 7/1995 | Arai et al. | |
| 2005/0282042 A1* | 12/2005 | Yamazaki | G11B 5/70678 428/842.8 |
| 2013/0256584 A1 | 10/2013 | Yamazaki et al. | |

FOREIGN PATENT DOCUMENTS

| | | |
|---|---|---|
| JP | 61-278104 A | 12/1986 |
| JP | 62-241827 A | 10/1987 |
| JP | 64-025504 A | 1/1989 |
| JP | 6-302421 A | 10/1994 |

(Continued)

OTHER PUBLICATIONS

Machine English Translation: Jinbo et al. (JP 2003-197413).*
Communication dated Nov. 24, 2015, issued by the Japan Patent Office in Japanese Application No. 2013-272726.

*Primary Examiner* — Holly Rickman
*Assistant Examiner* — Linda Chau
(74) *Attorney, Agent, or Firm* — Sughrue Mion, PLLC (57) ABSTRACT

An aspect of the present invention relates to magnetic powder, which is magnetoplumbite hexagonal strontium ferrite magnetic powder comprising 1 atomic percent to 5 atomic percent of Ba per 100 atomic percent of Fe, the average particle size of which ranges from 10 nm to 25 nm, and which is magnetic powder for magnetic recording.

9 Claims, 1 Drawing Sheet

(56) References Cited

FOREIGN PATENT DOCUMENTS

| JP | 08-040723 A | 2/1996 |
| JP | 2003-197413 A | 7/2003 |
| JP | 2013-211316 A | 10/2013 |

* cited by examiner

MAGNETIC POWDER FOR MAGNETIC RECORDING, MAGNETIC RECORDING MEDIUM, AND METHOD OF MANUFACTURING MAGNETIC POWDER FOR MAGNETIC RECORDING

CROSS-REFERENCE TO RELATED APPLICATIONS

This application claims priority under 35 U.S.C 119 to Japanese Patent Application No. 2013-272726 filed on Dec. 27, 2013. The above application is hereby expressly incorporated by reference, in its entirety.

BACKGROUND OF THE INVENTION

1. Field of the Invention

The present invention relates to magnetic powder for magnetic recording.

The present invention further relates to a magnetic recording medium comprising the above magnetic powder for magnetic recording as ferromagnetic powder in a magnetic layer, and to a method of manufacturing the above magnetic powder for magnetic recording.

2. Discussion of the Background

Hexagonal ferrite is widely employed as magnetic powder for magnetic recording. The coercive force thereof is great enough for use in permanent magnetic materials. The magnetic anisotropy that is the basis of the coercive force derives from its crystal structure. Thus, high coercive force can be maintained even when the size of the particles is reduced. Further, magnetic recording media employing hexagonal ferrite magnetic powder in a magnetic layer have high density characteristics due to the vertical component. Thus, hexagonal ferrite is ferromagnetic powder that is suited to high density recording.

In recent years, recording densities have been increasing in the field of magnetic recording. To achieve an accompanying reduction in noise, there has been a need to reduce the particle size of hexagonal ferrite.

However, when the size of hexagonal ferrite magnetic particles is reduced, the energy maintaining the magnetic particles in the direction of magnetization (magnetic energy) tends to be difficult to resist thermal energy. So-called thermal fluctuation ends up causing recording retention property to drop, and the phenomenon whereby magnetic energy is overcome by thermal energy and recording is lost can no longer be ignored. This point will be described in greater detail. "KuV/kT" is a known index relating to the thermal stability of magnetization. Ku is the anisotropy constant of a magnetic material, V is the particle volume (activation volume), k is the Boltzmann constant, and T is absolute temperature. When the magnetic energy KuV is increased relative to the thermal energy kT, it is possible to inhibit the effect of thermal fluctuation. However, the particle diameter V, that is, the particle size of the magnetic material, should be kept low to reduce the noise of the medium, as set forth above. Since the magnetic energy is the product of Ku and V, as stated above, it suffices to increase Ku to increase the magnetic energy when V is in the low range. However, the relation $HK=2Ku/Ms$ exists between Ku and the anisotropy field HK. When Ku is increased without a change in Ms, HK also increases. The anisotropy field HK is a magnetic field intensity that is necessary to achieve saturation magnetization from the direction of the hard axis of magnetization. When HK is high, the reversal of magnetization by the magnetic head tends not to occur, recording (the writing of information) becomes difficult, and the reproduction output ends up dropping. That is, the higher the Ku of the magnetic particle, the more difficult it is to write information.

As set forth above, it is extremely difficult to satisfy all three characteristics of higher density recording, thermal stability, and ease of writing. This is known as the trilemma of magnetic recording. It will be a major problem in achieving higher density recording in the future.

On the other hand, barium ferrite is widely employed as hexagonal ferrite for use in magnetic recording. However, strontium ferrite is known to have a higher Ku and a higher σs than barium ferrite. Since $HK=2Ku/Ms$ and $Ms=σs×ρ$ (ρ: specific gravity), strontium ferrite is a magnetic material that is advantageous for resolving the trilemma by achieving a low HK with a high Ku. In this regard, Japanese Unexamined Patent Publication (KOKAI) No. 2013-211316 or English language family member US2013/256584A1, which are expressly incorporated herein by reference in their entirety, proposes a method of manufacturing strontium ferrite that is suitable as magnetic powder for high-density recording.

SUMMARY OF THE INVENTION

As set forth above, strontium ferrite is a magnetic material that is useful for resolving the trilemma. However, as is described in Japanese Unexamined Patent Publication (KOKAI) No. 2013-211316, strontium ferrite tends to present a broader particle size distribution than barium ferrite. This tendency becomes marked when the particle size is reduced. In the field of magnetic recording, when the particle size distribution is broad, even in magnetic powder with a small average particle size, those components on the fine particle side of the particle size distribution may be affected by thermal fluctuation. The recorded magnetic energy may be overcome by thermal energy, presenting the possibility of the recording being lost. There are also cases where noise increases due to components on the coarse particle side of the particle size distribution. Thus, a sharp particle size distribution with particles of uniform size is needed in addition to a small particle size in magnetic powder for magnetic recording. Japanese Unexamined Patent Publication (KOKAI) No. 2013-211316 proposes to resolve the above matter by adjusting the composition of the starting material mixture in the course of preparing strontium ferrite by the glass crystallization method. However, regardless of the manufacturing method, it would greatly increase the general usefulness of strontium ferrite if strontium ferrite could be obtained that was in the form of fine particles with a sharp particle size distribution.

An aspect of the present invention provides for means for achieving both an increased uniformity of particle size and a reduced size of particles of strontium ferrite that are employed as magnetic powder in magnetic recording.

Magnetoplumbite-type (also described as "M-type"), W-type, Y-type, and Z-type crystal structures of hexagonal ferrite are known. In extensive research, the present inventor employed strontium ferrite of M-type crystal structure. As set forth above, hexagonal ferrite is a ferromagnetic material with magnetic characteristics that are suited to achieving higher density recording. Among the hexagonal ferrites, the magnetic characteristics of the M-type are advantageous for achieving higher density recording. The present inventor conducted extensive research in this regard. As a result, he discovered that by incorporating a prescribed quantity of barium into M-type hexagonal strontium ferrite, it was possible to obtain by various manufacturing methods such as the glass crystallization method and the continuous hydrothermal synthesis method set forth further below M-type hexagonal strontium ferrite that was comprised of fine particles, exhibited a sharp particle size distribution, and was suited to high-density recording. Since the crystallization temperature of barium ferrite is lower than the crystallization temperature of strontium ferrite, the present inventor presumed that when a small quantity of Ba was present, the barium ferrite crystallized (precipitated) before the strontium ferrite crystallized. This barium ferrite then could serve as nuclei for the progression of the crystallization of strontium ferrite. In the field of permanent magnets, ferrite with a composition comprising Sr and Ba is known (for example, see Japanese Unexamined Patent Publication (KOKAI) Heisei No. 1-261234, which is expressly incorporated herein by reference in its entirety). However, permanent magnets do not require the extremely fine particles that are required of magnetic powder for magnetic recording. Accordingly, the ferrite for use in permanent magnets that contains Sr and Ba does not in any way suggest a means for resolving the issue of uniformity of particle size in strontium ferrite for magnetic recording in the form of fine particles.

The present invention was devised based on the above discoveries.

An aspect of the present invention relates to magnetic powder, which is magnetoplumbite hexagonal strontium ferrite magnetic powder comprising 1 atomic percent to 5 atomic percent of Ba per 100 atomic percent of Fe, the average particle size of which ranges from 10 nm to 25 nm, and which is magnetic powder for magnetic recording.

In the present invention, the average particle size refers to the value determined by the method set forth below.

A photograph is taken of the particles at a magnification of 100,000-fold with a model H-9000 transmission electron microscope made by Hitachi, and printed on print paper at a total magnification of 500,000-fold. Target particles are selected from the photograph of the particles, the contours of the particles are traced with a digitizer, and Carl Zeiss image analysis software KS-400 is used to measure the size of the particles. The particle sizes of 500 particles are determined. In this context, the particle size is a primary particle size. The term "primary particle" refers to an unaggregated, independent particle. The average value (arithmetic average) of the particle size of the 500 particles obtained in this manner is adopted as the average particle size of the powder. The coefficient of variation in particle size set forth further below is a value calculated by dividing the standard deviation of the particle sizes of 500 particles by the average particle size.

In the present invention, the size of the particles constituting powder is denoted as follows based on the shape of the particles observed in the above particle photograph:

(1) When acicular, spindle-shaped, or columnar (with the height being greater than the maximum diameter of the bottom surface) in shape, the particle size is denoted as the length of the major axis constituting the particle, that is, the major axis length.
(2) When platelike or columnar (with the thickness or height being smaller than the maximum diameter of the plate surface or bottom surface) in shape, the particle size is denoted as the maximum diameter of the plate surface or bottom surface.
(3) When spherical, polyhedral, of unspecific shape, or the like, and the major axis constituting the particle cannot be specified from the shape, the particle size is denoted as the diameter of an equivalent circle. The term "diameter of an equivalent circle" means that obtained by the circle projection method.

When the particle has a specific shape, such as in the particle size definition of (1) above, the average particle size is the average major axis length. In the case of (2), the average particle size is the average plate diameter, with the average plate ratio being the arithmetic average of (maximum diameter/thickness or height). For the definition of (3), the average particle size is the average diameter (also called the average particle diameter).

The average particle size set forth above can be obtained by observing the powder that is present as powder by a transmission electron microscope. A measurement sample of the powder that is contained in the magnetic layer of a magnetic recording medium can be obtained by collecting powder from the magnetic layer. The measurement sample can be collected, for example, by the following method.

1. Subjecting the surface of the magnetic layer to 1 to 2 minutes of surface treatment with a plasma reactor made by Yamato Scientific Co., Ltd., and ashing the organic components (binder component and the like) of the surface of the magnetic layer to remove them.

2. Adhering filter paper that has been immersed in an organic solvent such as cyclohexanone or acetone to the edge portion of a metal rod, rubbing the surface of the magnetic layer that has been treated as in 1. above on it, and transferring the magnetic layer component from the magnetic tape to the filter paper to separate it.

3. Shaking off the component separated by 2. above in a solvent such as cyclohexanone or acetone (placing each piece of filter paper in solvent and using an ultrasonic disperser to shake it off), drying the solvent, and removing the separated component.

4. Placing the component that has been scraped off in 3. above in a glass test tube that has been thoroughly cleaned, adding n-butyl amine to about 20 mL of the magnetic layer component, and sealing the glass test tube. (The n-butyl amine is added in a quantity adequate to decompose the remaining binder that has not been ashed.)

5. The glass test tube is heated for equal to or more than 20 hours at 170° C. to decompose the binder and curing agent component.

6. The precipitate following the decomposition of 5. above is thoroughly washed with pure water and dried, and the powder is recovered.

7. A neodymium magnet is placed near the powder that has been collected in 6. and the powder that is attracted (that is, magnetic powder) is collected.

Magnetic powder can be collected from the magnetic layer by the above steps. Since the above processing can impart almost no damage to the particles, the above method permits measurement of the particle size of powder in the state in which it was contained in the magnetic layer.

In an embodiment, in the above magnetic powder, the content of Ba per 100 atomic percent of the combined content of Sr and Ba ranges from 5 atomic percent to 40 atomic percent.

In an embodiment, the above magnetic powder further comprises Al.

In an embodiment, in the above magnetic powder, the content of Al per 100 atomic percent of Fe ranges from 0.5 atomic percent to 6 atomic percent.

In an embodiment, in the above magnetic powder, at least a part of the Al is present on the surface of the magnetic powder.

In an embodiment, the above magnetic powder further comprises Ca.

In an embodiment, in the above magnetic powder, the content of Ba per 100 atomic percent of the combined content of Sr, Ca, and Ba ranges from 1 atomic percent to 20 atomic percent.

A further aspect of the present invention relates to a magnetic recording medium, which comprises a magnetic layer comprising ferromagnetic powder and binder on a nonmagnetic support, wherein the ferromagnetic powder is the above magnetic powder.

A further aspect of the present invention relates to a method of manufacturing magnetic powder for magnetic recording, which comprises providing the magnetic powder for magnetic recording set forth above by a glass crystallization method with a starting material mixture comprising at least Sr, Ba, and Fe.

In an embodiment, the starting material mixture further comprises Al. A Ba-containing M-type hexagonal strontium ferrite further containing Al can be thus obtained.

In an embodiment, the starting material mixture further comprises Ca. A Ba-containing M-type hexagonal strontium ferrite further containing Ca can be thus obtained.

A further aspect of the present invention relates to a method of manufacturing magnetic powder for magnetic recording, wherein the magnetic powder for magnetic recording medium is the magnetic powder for magnetic recording set forth above, and the method comprises:

preparing a hexagonal ferrite precursor by mixing an Fe salt, an Sr salt, and a Ba salt in a base-containing water-based solution; and converting the hexagonal ferrite precursor to hexagonal ferrite by feeding a water-based solution comprising the hexagonal ferrite precursor that has been prepared continuously to a reaction flow passage while heating the water-based solution to a temperature of equal to or higher than 300° C. as well as applying a pressure of equal to or higher than 20 MPa to the water-based solution.

In an embodiment, the conversion to hexagonal ferrite is conducted by:

mixing the water-based solution comprising the hexagonal ferrite precursor that has been prepared with an organic modifying agent; then mixing a solution, that has been provided by the mixing, with water that is being continuously fed while heating and applying pressure to prepare a mixture and feeding the mixture to the reaction flow passage.

In an embodiment, the above method further comprises heating and pressurizing a water-based solution comprising an Al compound and hexagonal ferrite that has been provided by the conversion of the hexagonal ferrite precursor to make Al adhere to a surface of the hexagonal ferrite.

In an embodiment, the heating and pressurizing is conducted by feeding the water-based solution, comprising an Al compound and hexagonal ferrite that has been prepared by the conversion of the hexagonal ferrite precursor, continuously to a reaction flow passage the fluid flowing through which is heated to equal to or higher than 300° C. and pressurized to a pressure of equal to or higher than 20 MPa.

In an embodiment, the above method further comprises mixing the water-based solution comprising an Al compound and hexagonal ferrite provided by the conversion of the hexagonal ferrite precursor with water that is continuously fed while being heated and pressurized, and then feeding to the reaction flow passage.

In an embodiment, the above method further comprises mixing a Ca salt with an Fe salt, Sr salt, and Ba salt during the mixing in a base-containing water-based solution. A Ba-containing M-type hexagonal strontium ferrite containing Ca can be thus obtained.

An aspect of the present invention can provide M-type hexagonal strontium ferrite in the form of fine particles, with a sharp particle size distribution.

Using the above magnetic powder for magnetic recording as the ferromagnetic powder in a magnetic layer can provide a magnetic recording medium that is suited to high-density recording.

Other exemplary embodiments and advantages of the present invention may be ascertained by reviewing the present disclosure and the accompanying drawings.

BRIEF DESCRIPTION OF THE DRAWINGS

The present invention will be described in the following text by the exemplary, non-limiting embodiments shown in the drawing, wherein.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

Magnetic Powder for Magnetic Recording

An aspect of the present invention relates to magnetic powder, which is magnetoplumbite hexagonal strontium ferrite magnetic powder comprising 1 atomic percent to 5 atomic percent of Ba per 100 atomic percent of Fe, the average particle size of which ranges from 10 nm to 25 nm, and which is magnetic powder for magnetic recording.

The magnetic powder for magnetic recording (also referred to simply as the "magnetic power" hereinafter or the "magnetic recording powder") will be described in greater detail below.

The average particle size of the above magnetic powder ranges from 10 nm to 25 nm. When the average particle size is less than 10 nm, thermal fluctuation may cause the stability of magnetization to decrease, compromising the SFD. At greater than 25 nm, noise may increase and the SNR may decrease. From the above reasons, the average particle size is desirably equal to or greater than 12 nm, preferably equal to or greater than 13 nm, and desirably equal to or less than 24 nm, preferably equal to or less than 23 nm. The particle size of the magnetic powder can be adjusted by means of manufacturing conditions such as the crystallization conditions. The coefficient of variation in particle size obtained by the method set forth above can be employed as an index of the particle size distribution. The magnetic powder according to an aspect of the present invention contains a prescribed quantity of Ba and thus desirably has a coefficient of variation in particle size of equal to or less than 30 percent. For example, it can exhibit a coefficient of variation in particles size falling within a range of 5 percent to 30 percent, desirably 10 percent to 30 percent. The coefficient of variation in particle size is preferably equal to or less than 27 percent, more preferably equal to or less than 25 percent, and still more preferably, equal to or less than 20 percent.

As set forth above, the magnetic powder according to an aspect of the present invention is M-type strontium ferrite comprising Ba. However, when the quantity of Ba is less than 1 atomic percent per 100 atomic percent of Fe, it is difficult to achieve increased uniformity of the particle size distribution by adding Ba. Conversely, when the quantity of Ba exceeds 5 atomic percent per 100 atomic percent of Fe, the high ratio of Ba among the alkaline earth metal elements causes the magnetic powder to exhibit magnetic characteristics resembling those of barium ferrite. It becomes difficult to achieve an adequate enhancement in magnetic characteristics and a higher Ku by adopting strontium ferrite as the hexagonal ferrite. For these reasons, the Ba content of the magnetic powder is specified as falling within a range of 1 atomic percent to 5 atomic percent per 100 atomic percent of Fe. From the perspective of achieving an even more uniform particle size distribution, the Ba content is desirably equal to or higher than 1.1 atomic percent, preferably equal to or higher than 1.3 atomic percent, more preferably equal to or higher than 1.5 atomic percent. From the perspective of achieving a high Ku, the Ba content is desirably equal to or less than 4.9 atomic percent, preferably equal to or less than 4.5 atomic percent, more preferably equal to or less than 4 atomic percent, still more preferably equal to or less than 3.5 atomic percent. From the above perspectives, the Ba content is desirably equal to or higher than 5 atomic percent, preferably equal to or higher than 10 atomic percent, more preferably equal to or higher than 12 atomic percent, per 100 atomic percent of the combined content of Sr and Ba. The Ba content is desirably equal to or less than 40 atomic percent, preferably equal to or less than 35 atomic percent, more preferably equal to or less than 30 atomic percent, still more preferably equal to or less than 25 atomic percent, and yet more preferably, equal to or less than 20 atomic percent, per 100 atomic percent of the combined content of Sr and Ba. The method of manufacturing M-type hexagonal strontium ferrite comprising a prescribed quantity of Ba will be described further below. In an embodiment, the Ba is contained in the magnetic powder as nuclei of M-type strontium ferrite in the form of barium ferrite, desirably M-type barium ferrite. Examples of specific forms are a core/shell structure in which barium ferrite constitutes the core and strontium ferrite constitutes the shell, and a structure in which a plurality of fine particles of barium ferrite are dispersed in strontium ferrite. However, the state in which the Ba is present is not limited to these states. For example, in the M-type hexagonal ferrite crystal structure denoted by the compositional formula $MFe_{12}O_{19}$, Ba can be contained at the position of the divalent element denoted by M. That is, at least some of the Ba can be contained in the crystal structure of M-type hexagonal strontium ferrite as a substitute element for Sr.

The above magnetic powder contains alkaline earth metal elements in the form of Sr and Ba as essential components. However, it can also contain Ca as an additional alkaline earth metal element. The incorporating of Ca can achieve an even higher Ku. This point will be described in greater detail. Although strontium ferrite has a higher Ku than barium ferrite, research by the present inventor has revealed that the Ku tends to drop as the particle size decreases. The fact that the addition of Ca can inhibit the drop in Ku due to a decrease in particle size was discovered for the first time ever as a result of research conducted by the present inventor.

From the perspective of achieving a good effect on raising the Ku through the presence of Ca, the magnetic powder according to an aspect of the present invention desirably comprises a Ca content falling within a range of 1 atomic percent to 20 atomic percent per 100 atomic percent of the combined content of Sr, Ba, and Ca. The Ca content per 100 atomic percent of Fe desirably falls within a range of 0.05 atomic percent to 3 atomic percent. In an embodiment, the Ca is contained at the position of the divalent element denoted by M in the above compositional formula. However, there is no limitation to this embodiment. The Ca can be present in other states, such as in the form of a coating on the surface of particles of M-type hexagonal strontium ferrite. As set forth in Examples further below, the addition of a prescribed quantity of Ca has been found to increase the saturation magnetization σs.

The above magnetic powder contains Ba and can contain Ca as set forth above. It can also further contain Al as an optional element. The state in which the Al is present is not specifically limited. It can be contained within the crystal structure of the M-type hexagonal ferrite, or can adhere to the surface of the hexagonal ferrite. In one embodiment, at least a part of the Al adheres to the surface of the hexagonal ferrite. Al which adheres to the surface of the particle can inhibit aggregation between particles, thereby achieving a further rise in the SNR. Accordingly, in one embodiment, the magnetic powder can comprise a core of hexagonal ferrite (Ba-containing M-type hexagonal strontium ferrite) and an Al-containing coating as a shell in a core/shell structure. The shell can be present on the core in a continuous phase, or in a discontinuous phase where some portions are not coated, known as an island-sea structure. These points can also be applied to the core/shell structure formed by barium ferrite and strontium ferrite set forth above. By way of example, the content of Al in the magnetic powder ranges from 0.1 atomic percent to 10 atomic percent per 100 atomic percent of Fe. From the perspective of further raising the SNR, it is desirably equal to or higher than 0.5 atomic percent. In addition, from the perspective of magnetic characteristics, the greater the proportion of the particle that is accounted for by the portion exhibiting magnetic properties, the better. From this perspective, the Al content is desirably equal to or less than 7 atomic percent, preferably equal to or less than 6 atomic percent, per 100 atomic percent of Fe. One embodiment of the method of manufacturing magnetic powder containing Al will be set forth below.

The magnetic powder according to an aspect of the present invention is M-type hexagonal strontium ferrite, which contains Ba and can contain Ca and Al as optional elements. In addition to the above elements, it can also contain other elements. Examples of the other elements are Bi, Si and the like that can be added to adjust the shape of the particles and the like. It is also possible to add elements that are known for adjusting the coercive force of hexagonal ferrite. Alternatively, in one embodiment, the magnetic powder desirably does not contain the other elements. In this context, the term "does not contain" means that none is actively added in the process of manufacturing as an element that is contained in the magnetic powder, and is not intended to apply to impurities. For example, the inclusion of a quantity of about equal to or less than 0.001 atomic percent per 100 atomic percent of Fe is permissible. Rare earth elements and transition metal elements excluding the Fe that is required to form ferrite may sometimes cause variation in the compositional distribution between particles. As a result, the proportion accounted for by particles with poor recording retention properties (particles that demagnetize immediately following recording) and particles that do not contribute to recording may sometimes increase. For this reason, in an embodiment, the magnetic powder desirably contains no rare earth elements or transition metal elements other than Fe. In the present invention, the term "rare earth elements" refers to Y, La, Ce, Pr, Nd, Pm, Sm, Eu, Gd, Tb, Dy, Ho, Er, Tm, Yb, and Lu, and the term "transition metal elements other than Fe" refers to Ti, V, Cr, Mn, Co, Ni, Cu, Zn, Zr, Nb, Mo, Ru, Hf, Ta, and W.

As set forth above, the M-type crystal structure is advantageous for achieving higher density recording among the various crystal structures of hexagonal ferrite. Thus, the above magnetic powder will desirably reveal a single phase magnetoplumbite structure by XRD diffraction analysis (X-ray diffraction analysis). The XRD diffraction analysis can be conducted under the conditions described in Examples further below, for example.

Method for Manufacturing Magnetic Powder for Magnetic Recording

The magnetic powder for magnetic recording according to an aspect of the present invention can be manufactured by any manufacturing method and the manufacturing method thereof is not specifically limited. By way of example, a method that is known as a method of manufacturing M-type hexagonal ferrite can be adopted as the manufacturing method, such as the coprecipitation method, reverse micelle method, hydrothermal synthesis method, and glass crystallization method. In the various manufacturing methods, Ba can be incorporated in the starting material mixture in addition to Sr and Fe needed to obtain strontium ferrite to obtain Ba-containing M-type strontium ferrite.

It is said that the glass crystallization method is a good method for manufacturing hexagonal ferrite for magnetic recording because of points such as yielding magnetic powder with fine particle suitability and/or single particle dispersion suitability that are desirable in a magnetic recording medium, with a narrow particle size distribution, and the like. Accordingly, in one aspect of the present invention, the magnetic powder is desirably prepared by the glass crystallization method. Alternatively, the magnetic powder according to an aspect of the present invention is desirably obtained by a synthesis method based on the continuous hydrothermal synthesis process (also referred to hereinafter as the "supercritical synthesis method") that has been proposed as a method of synthesizing nanoparticles in recent years. Among these, a synthesis method based on a continuous hydrothermal synthesis process is desirable as a manufacturing method from the perspective of greater uniformity of the particle size distribution and a higher Ku. These manufacturing methods will be described in greater detail below.

A method of manufacturing hexagonal ferrite based on the glass crystallization method generally comprises the following steps:

(1) The step of melting a starting material mixture comprising hexagonal ferrite-forming components (which may optionally contain coercive force-adjusting components) and glass-forming components to obtain a melt (melting step);

(2) The step of quenching the melt to obtain an amorphous material (amorphous material-forming step);

(3) The step of heat treating the amorphous material to cause hexagonal ferrite particles to precipitate (crystallization step); and (4) The step of collecting the hexagonal ferrite magnetic particles that have precipitated from the heat-treated product (particle collecting step).

By way of example, see Japanese Unexamined Patent Publication (KOKAI) No. 2011-213544, paragraphs 0018 to 0035 and Japanese Unexamined Patent Publication (KOKAI) No. 2011-225417, paragraphs 0013 to 0024 for details regarding the above steps. The above publications are expressly incorporated herein by reference in their entirety. Normally, all or nearly all of the Ba that is contained in the starting material mixture will be incorporated into the magnetic powder that is prepared. Thus, the Ba content of the magnetic powder obtained can be controlled by means of the composition of the starting material mixture. Accordingly, it is desirable to employ a starting material mixture containing Ba falling within a range of 1 atomic percent to 5 atomic percent per 100 atomic percent of Fe. The Ba can be mixed in during preparation of the starting material mixture as an oxide, or as various salts (such as carbonates) that will change into oxides in steps such as the melting step. As set forth above, the magnetic powder according to an aspect of the present invention can contain Ca. Since all or nearly all of the Ca that is contained in the starting material mixture will normally be incorporated into the magnetic powder that is prepared, the content of Ca in the magnetic powder that is obtained can be controlled by means of the composition of the starting material mixture. By way of example, the use of a starting material mixture containing Ca falling within a range of 1 atomic percent to 20 atomic percent per 100 atomic percent of the combined contents of Sr, Ca, and Ba will yield a magnetic powder containing that amount of Ca. In the same manner as Ba and the like, Ca can be mixed in during the preparation of the starting material mixture in the form of an oxide, or in the form of various salts (such as carbonates) that will change into oxides in steps such as melting. As set forth above, the incorporation of Ca into the starting material mixture can inhibit a drop in the Ku due to reduced particle size in the magnetic powder that is obtained.

As described above, the magnetic powder according to an aspect of the present invention can contain Al. The method of adding Al is not specifically limited. For example, it can be adhered to the surface of the magnetic powder by a surface treatment. In a desirable embodiment, Al is incorporated in the starting material mixture in the glass crystallization method. As described in paragraph 0008 in Japanese Unexamined Patent Publication (KOKAI) No. 2011-225417, Al can adhere to the surface of the magnetic particles in a state of non-aggregation. Desirably, a starting material mixture containing Al in the form of an oxide, or a compound capable of changing into an oxide in the melting step or the like (such as a hydroxide) is employed in the glass crystallization method. Reference can be made to the description in Japanese Unexamined Patent Publication (KOKAI) No. 2011-225417, paragraph 0017, for details on starting material mixtures containing Al. In one embodiment, a starting material mixture containing about 0.1 mole percent to about 10 mole percent of an Al compound can be employed. Reference can be made to the description in Japanese Unexamined Patent Publication (KOKAI) No. 2011-225417, paragraphs 0013 to 0024, and the like for details on the embodiment of preparing magnetic powder containing Al by the glass crystallization method.

The manufacturing method based on a continuous hydrothermal synthesis process will be described next.

The manufacturing method based on a continuous hydrothermal synthesis process is a method by which a water-based fluid containing a hexagonal ferrite precursor is heated and pressurized while being fed to a reaction flow passage. The high reactivity of water at high temperature and high pressure, desirably water in a subcritical to supercritical state, is used to convert the hexagonal ferrite precursor to ferrite.

The above hexagonal ferrite precursor can be obtained by mixing an Fe salt and an alkaline earth metal salt in a base-containing water-based solution. The magnetic powder according to an aspect of the present invention contains alkaline earth metals in the form of Sr and Ba, so at a minimum an Sr salt and a Ba salt are employed as alkaline earth metal salts. By further employing a Ca salt, it is possible to contain a magnetic powder that also contains Ca. The quantity of each of the salts employed can be determined based on the desired magnetic powder composition taking into account the reaction rates of the various elements, the reaction conditions in the continuous hydrothermal synthesis process, and the like. The quantities of the various salts employed are desirably determined so that the contents of the various elements fall within the above ranges or desirable ranges. Optional preliminary experiments can also be conducted to determine the quantities employed.

Normally, salts containing Fe and alkaline earth metals can precipitate as particles, desirably colloidal particles, in the base-containing water-based solution. The particles that precipitate can be subsequently converted to ferrite and become hexagonal ferrite magnetic particles by placing them in the presence of water under high temperature and high pressure, desirably water in a subcritical to supercritical state.

A water-soluble salt is desirable as the alkaline earth metal salt. For example, hydroxides; halides such as chlorides, bromides, and iodides; and nitrates can be employed.

Fe salts in the form of water-soluble salts of iron such as halides such as chlorides, bromides, and iodides; nitrates; sulfates; carbonates; organic acid salts; complex salts; and the like can be employed.

The above-described salts can be mixed in the base-containing water-based solution to cause particles containing the elements that were contained in the salts (the hexagonal ferrite precursor) to precipitate. The particles that precipitate can be subsequently converted to ferrite and then hexagonal ferrite. In the present invention, the term "base" refers to one or more bases as defined by Arrhenius, Bronsted, or Lewis (Arrhenius bases, Bronsted bases, or Lewis bases). Specific examples are sodium hydroxide, potassium hydroxide, sodium carbonate, and ammonia water. However, there is no limitation to these bases. Nor is there any limitation to inorganic bases; organic bases can also be employed. The quantity of base that is employed in the water-based solution is desirably about 0.1 to 10-fold based on weight, preferably about 0.2 to 8-fold, the combined weight of the salts added to the water-based solution. The higher the concentration of the base, the finer the particles that precipitate tend to be. Since there are cases where salts contained in the water-based solution along with the base will also be acid substances, the pH of the water-based solution is not limited to being basic; there will be cases where it is neutral or acidic. By way of example, the pH of the water-based solution, as the pH at the temperature of the solution during the reaction, is equal to or higher than 4 but equal to or lower than 14. From the perspective of getting the precursor synthesis reaction to proceed smoothly, it is desirably equal to or higher than 5 but equal to or lower than 14, preferably equal to or higher than 6 but equal to or lower than 13, and more preferably equal to or higher than 6 but equal to or lower than 12. A pH that is equal to or higher than 7 or exceeds 7 (neutral to basic) is still more desirable. Any acid can be used to adjust the pH. In the same manner as for the base, the acid refers to one or more acids as defined by Arrhenius, Bronsted, or Lewis (Arrhenius acids, Bronsted acids, or Lewis acids). Any of the acids commonly employed to adjust the pH can be employed without limitation as the acid. Specific examples are hydrochloric acid, nitric acid, and sulfuric acid. There is no limitation to inorganic acids; organic acids can also be employed. The solution temperature of the above water-based solution can be controlled by heating or cooling, or can be room temperature without temperature control. The solution temperature desirably ranges from 10° C. to 90° C. Even when uncontrolled (for example, about 20° C. to 25° C.), the reaction will proceed adequately.

The solvent (water-based solvent) contained in the above water-based solution can be simply water, or can be a mixed solvent of water and an organic solvent. The term "water-based solvent" refers to a solvent containing water, desirably to a solvent containing equal to or more than 50 weight percent of water per the total quantity of solvent. The solvent employed to prepare the precursor is preferably water alone.

An organic solvent that is miscible with water or hydrophilic is desirable as a water-based solvent for use in combination with water. From this perspective, the use of a polar solvent is suitable. In this context, the term "polar solvent" refers to a solvent with a dielectric constant of equal to or higher than 15, a solubility parameter of equal to or higher than 8, or both. Examples of desirable organic solvents are alcohols, ketones, aldehydes, nitriles, lactams, oximes, amides, ureas, amines, sulfides, sulfoxides, phosphoric acid esters, carboxylic acids, and carboxylic acid derivatives in the form of esters, carbonic acid, carbonic acid esters, and ethers.

The hexagonal ferrite precursor can also be prepared in the presence of an organic compound. A precursor that has been prepared in the presence of an organic compound could conceivably be subjected to a conversion reaction to hexagonal ferrite in a state where the organic compound adheres to the surface, and crystallized after having been instantaneously dissolved in a high-temperature, high-pressure system to cause hexagonal ferrite particles to precipitate (conversion to hexagonal ferrite). The presence of an organic compound in the vicinity of the particles from dissolution to crystallization is presumed by the present inventor to contribute to further achieving the crystallization of fine hexagonal ferrite particles of uniform particle size. The fact that synthesis in the presence of an organic compound can inhibit aggregation of the precursor and makes it possible to obtain a precursor in the form of further fine particles with good uniformity of particle size is also thought to contribute to obtaining hexagonal ferrite in the form of fine particles of good uniformity of particle size. The details of the organic compound are as set forth below for the organic modifying compound. The organic compound need only be present in the reaction solution along with the starting material compounds of the precursor; the mixing order with the starting material compounds of the precursor is not specifically limited. From the perspective of more effectively preventing aggregation of the precursor during preparation, the organic compound is desirably added to the reaction solvent and dissolved or suspended, after which the starting material compounds are added. The organic compound can be added as is to the reaction solvent, or added in the form of a solution or suspension. Solvents that can be used in solutions or suspensions are as set forth above.

The quantity of organic solvent that is employed desirably ranges from 0.01 weight part to 1,000 weight parts, preferably within a range of 0.05 weight part to 500 weight parts, and more preferably, within a range of 0.1 weight part to 300 weight parts per 100 weight parts of precursor. The quantity of precursor serving as a basis here is the measured value or the quantity that is theoretically produced from the quantities of starting materials charged. This also holds true for the values described below for the quantities based on the quantity of precursor.

Next, the water-based solution containing the hexagonal ferrite precursor is heated and pressurized, and the water contained is placed in a state of high temperature and high pressure, preferably in a subcritical to supercritical state, to cause the hexagonal ferrite precursor to undergo a ferrite conversion reaction (ferrite conversion) within the particles. As a result, hexagonal ferrite particles (M-type hexagonal strontium ferrite particles containing Ba) can be obtained. Generally, a fluid containing water as solvent is heated to equal to or higher than 300° C. and subjected to a pressure of equal to or higher than 20 MPa to place the water contained in the fluid in a subcritical to supercritical state.

The following are examples of specific embodiments of the process of converting the hexagonal ferrite precursor to hexagonal ferrite.

(1) A water-based solution containing hexagonal ferrite precursor is continuously fed to a reaction flow passage that heats the fluid flowing through it to equal to or higher than 300° C. and pressurizes the fluid to a pressure of equal to or higher than 20 MPa, thereby converting the hexagonal ferrite precursor to hexagonal ferrite within the reaction flow passage.

(2) After the water-based solution containing the particles of hexagonal ferrite precursor has been mixed with heated and pressurized water, desirably water that has been heated to equal to or higher than 200° C. and subjected to a pressure of equal to or higher than 20 MPa, it is continuously fed to a reaction flow passage that heats the fluid flowing through it to equal to or higher than 300° C. and subjects the fluid to a pressure of equal to or higher than 20 MPa, thereby converting the hexagonal ferrite precursor to hexagonal ferrite.

Embodiment (2) differs from embodiment (1) in that the heated and pressurized water is brought into contact with the water-based solution containing the hexagonal ferrite precursor, while, in embodiment (1), the water-based solution containing the hexagonal ferrite precursor is heated and pressurized to a subcritical to supercritical state. For example, a water-based solution containing a hexagonal ferrite precursor can be added to a liquid feed passage to which heated and pressurized water is being continuously fed to bring the water-based solution into contact with the heated and pressurized water. In embodiment (2), because the hexagonal ferrite precursor can be instantaneously placed in a highly reactive state by bringing it into contact with heated and pressurized water, the conversion to ferrite can take place sooner, which is advantageous. Generally, water assumes a highly reactive subcritical to supercritical state when heated to equal to or higher than 200° C. and pressurized to equal to or higher than 20 MPa. Accordingly, in embodiment (2), the water is desirably heated to a temperature of equal to or higher than 200° C. and subjected to a pressure of equal to or higher than 20 MPa.

Treating hexagonal ferrite magnetic particles with an organic modifying agent is an effective means of preventing aggregation between particles. As is described in Japanese Unexamined Patent Publication (KOKAI) No. 2009-208969, which is expressly incorporated herein by reference in its entirety, in one embodiment, such an organic modifying agent can be added to the reaction system once the conversion to ferrite has begun.

In another embodiment, before heating and pressurizing a water-based solution containing hexagonal ferrite magnetic particles and an Al compound, described further below, the organic modifying agent can be added to the water-based solution. The details are set forth further below.

In yet another embodiment, the organic modifying agent can be added to the water-based solution containing the hexagonal ferrite precursor, after which the mixture is subjected to the process of embodiment (1) or embodiment (2) above. Thus, the organic modifying agent can adhere to the hexagonal ferrite precursor particles, thereby effectively preventing the aggregation of particles and yielding an extremely fine magnetic powder.

Examples of the above organic modifying agent are organic carboxylic acids, organic nitrogen compounds, organic sulfur compounds, organic phosphorus compounds, salts thereof, surfactants, and various polymers. Examples of suitable polymers are those having a weight average molecular weight of about 1,000 to about 100,000. Those exhibiting water solubility are desirable. Examples of desirable polymers are nonionic polymers and hydroxyl group-comprising polymers. Salts of alkali metals are suitable as the above salts. The above weight average molecular weight refers to a value that is measured by gel permeation chromatography (GPC) and converted to a polystyrene value.

Examples of organic carboxylic acids are aliphatic carboxylic acids, alicyclic carboxylic acids, and aromatic carboxylic acids. Aliphatic carboxylic acids are desirable. The aliphatic carboxylic acid may be a saturated aliphatic carboxylic acid or an unsaturated aliphatic carboxylic acid, with an unsaturated carboxylic acid being preferred. The number of carbon atoms of the carboxylic acid is not specifically limited; for example, it can be equal to or more than 2. By way of example, it can be equal to or lower than 24, desirably equal to or lower than 20, preferably equal to or lower than 16. Specific examples of aliphatic carboxylic acids are: oleic acid, linoleic acid, linolenic acid, caprylic acid, capric acid, lauric acid, behenic acid, stearic acid, myristic acid, palmitic acid, myristoleic acid, palmitoleic acid, vaccenic acid, eicosenoic acid, propanoic acid, butanoic acid, pentanoic acid, hexanoic acid, heptanoic acid, octanoic acid, nonanoic acid, decanoic acid, dodecanoic acid, tetradecanoic acid, hexadecanoic acid, heptadecanoic acid, octadecanoic acid, nonadecanoic acid, icosanoic acid, and acetic acid; as well as dicarboxylic acids such as malonic acid, succinic acid, and adipic acid. However, there is no limitation thereto.

Examples of organic nitrogen compounds are organic amines, organic amide compounds, and nitrogen-containing heterocyclic compounds.

The organic amine can be a primary amine, secondary amine, or tertiary amine. Primary and secondary amines are desirable. Aliphatic amines are an example, as are primary and secondary aliphatic amines. The number of carbon atoms of the amines is not specifically limited; examples are equal to or more than 5 but equal to or lower than 24, desirably equal to or more than 8 and equal to or lower than 20, preferably equal to or more than 12 but equal to or lower than 18. Specific examples of organic amines are alkylamines such as oleylamine, laurylamine, myristylamine, palmitylamine, stearylamine, octylamine, decylamine, dodecylamine, tetradecylamine, hexadecylamine, octadecylamine, and dioctylamine; aromatic amines such as aniline; hydroxyl group-comprising amines such as methylethanolamine and diethanolamine; and derivatives thereof.

Examples of nitrogen-containing heterocyclic compounds are saturated and unsaturated heterocyclic compounds having three to seven-membered rings with 1 to 4 nitrogen atoms. Hetero atoms in the form of sulfur atoms, oxygen atoms, and the like can be contained. Specific examples are pyridine, lutidine, cholidine, and quinolines.

Examples of organic sulfur compounds are organic sulfides, organic sulfoxides, and sulfur-containing heterocyclic compounds. Specific examples are dialkyl sulfides such as dibutyl sulfide; dialkyl sulfoxides such as dimethyl sulfoxide and dibutyl sulfoxide; and sulfur-containing heterocyclic compounds such as thiophene, thiolane, and thiomorpholine.

Examples of organic phosphorus compounds are phosphoric acid esters, phosphines, phosphine oxides, trialkyl phosphines, phosphorous acid esters, phosphonic acid esters, sub-phosphonic acid esters, phosphinic acid esters, and sub-phosphinic acid esters. Examples are tributyl phosphine, trihexyl phosphine, trioctyl phosphine, and other trialkyl phosphines; tributyl phosphine oxide, trihexyl phosphine oxide, trioctyl phosphine oxide (TOPO), tridecyl phosphine oxide, and other trialkyl phosphine oxides.

Examples of polymers and surfactants are polyethylene glycol, polyoxyethylene (1) lauryl ether phosphate, lauryl ether phosphate, sodium polyphosphate, sodium bis(2-ethylhexyl)sulfosuccinate, sodium dodecylbenzene sulfonate, polyacrylic acid and its salts, polymethacryic acid and its salts, polyvinyl alcohol, other hydroxyl group-comprising polymers, polyvinyl pyrrolidone, other nonionic polymers, and hydroxyethyl cellulose. Any from among cationic, anionic, and nonionic surfactants, as well as amphoteric surfactants, can be employed. Anionic surfactants are desirable.

The above organic modifying agent is desirably admixed in a quantity of about 1 weight part to 1,000 weight parts per 100 weight parts of hexagonal ferrite precursor. This makes it possible to more effectively inhibit particle aggregation. The organic modifying agent can be added as is to the water-based solution containing the hexagonal ferrite precursor, and addition of the organic modifying agent as a solution in a solvent (organic modifying agent solution) is desirable to obtain magnetic powder of fine particles. A solvent in the form of water or water and an organic solvent that is miscible with water or hydrophilic is desirable. From the above perspective, it is suitable to employ a polar solvent as the organic solvent. In this context, the term "polar solvent" refers to a solvent that has a dielectric constant of equal to or higher than 15, has a solubility parameter of equal to or higher than 8, or both. The various solvents set forth above are examples of desirable organic solvents.

The organic modifying agent can be mixed in batches or continuously. Doing so continuously with subsequent steps can enhance productivity, so continuous mixing in is desirable.

Figure 1:
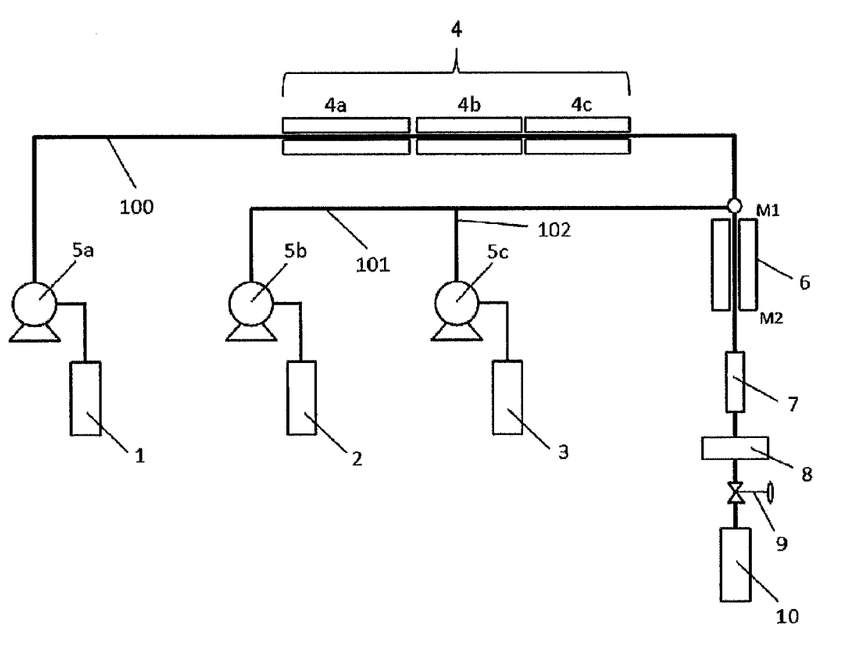
FIG. 1 is a schematic diagram of a manufacturing device that is suited to a continuous hydrothermal synthesis process.

FIG. 1 is a schematic diagram of a manufacturing device that is suited to the continuous hydrothermal synthesis process. An example of a specific embodiment of the method of manufacturing a magnetic powder according to an aspect of the present invention will be described based on FIG. 1. However, the present invention is not limited to the embodiment set forth below.

The manufacturing device shown in FIG. 1 comprises liquid tanks 1, 2 and 3; a heating means 4 (4a to 4c); pressurized liquid feeding means 5a, 5b, and 5c; a reaction flow passage 6; a cooling element 7; a filtering means 8; a pressure regulating valve 9; and a recovery element 10. Fluid is fed from the various liquid tanks by pipes 100, 101, and 102.

In one embodiment, water such as purified water or distilled water is introduced to liquid tank 1, an aqueous solution containing hexagonal ferrite precursor is introduced to liquid tank 2, and an organic modifying agent solution is introduced to liquid tank 3. The water that is introduced to liquid tank 1 is fed through pipe 100 while being pressurized by pressurized liquid feeding means 5a, and heated by heating means 4 to put the water in a subcritical to supercritical state, in which it arrives at mixing element M1.

The aqueous solution containing hexagonal ferrite precursor that has been fed through pipe 101 by pressurized liquid feeding means 5b from liquid tank 2 converges with the organic modifying agent solution that has been fed through pipe 102 by pressurized liquid feeding means 5c from liquid tank 3, and arrives at mixing element M1.

Prior to arriving at mixing element M1, the organic modifying agent desirably adheres to the surface of the hexagonal ferrite precursor. It is advantageous in terms of obtaining fine particles of hexagonal ferrite to make the organic modifying agent adhere to the hexagonal ferrite precursor in this manner prior to bringing it into contact with the water in a subcritical to supercritical state. To this end, water, or an organic solvent that is miscible with water or hydrophilic is desirably employed as the solvent of the organic modifying agent solution.

Next, the water-based solution containing the hexagonal ferrite precursor is brought into contact with the water in a subcritical to supercritical state in mixing element M1 to start converting the precursor to ferrite. Subsequently, it is heated in reaction flow passage 6 and further pressurized by pressurizing means 5a to cause the water contained in the reaction system within reaction flow passage 6 to enter a subcritical to supercritical state and further advance conversion of the precursor to ferrite. Subsequently, solution containing hexagonal ferrite magnetic particles (M-type hexagonal strontium ferrite containing Ca) obtained by the conversion of hexagonal ferrite precursor to ferrite is discharged through discharge outlet M2. The discharged solution is cooled by mixing with cold water in cooling element 7, after which the hexagonal ferrite magnetic particles are collected by filtering means 8 (a filter or the like). The hexagonal ferrite magnetic particles that have been collected by filtering means 8 are released by filtering means 8, pass through pressure regulating valve 9, and are recovered in recovery element 10.

In the above method, since pressure is applied to the fluid that is fed to the interior, high-pressure metal pipe is desirably employed as the piping. Due to low corrosion, a stainless steel such as SUS316 or SUS304, or a nickel-based alloy such as Inconel (registered trademark in Japan) or Hastelloy (registered trademark in Japan), is desirably employed as the metal constituting the piping. However, there is no limitation to these materials, and an equivalent or similar material can also be employed. Piping of the laminate configuration described in Japanese Unexamined Patent Publication (KOKAI) No. 2010-104928, which is expressly incorporated herein by reference in its entirety, can also be employed.

In the manufacturing device shown in FIG. 1, the water in a subcritical to supercritical state and the water-based solution containing hexagonal ferrite precursor are mixed together in a mixing element M1 where the pipes are joined by a T-shaped joint. However, it is also possible to employ a reactor such as that employed in Japanese Unexamined Patent Publication (KOKAI) No. 2007-268503, 2008-12453, or 2010-75914, which are expressly incorporated herein by reference in their entirety. The reactor material is desirably that described in Japanese Unexamined Patent Publication (KOKAI) No. 2007-268503, 2008-12453, or 2010-75914. Specifically, the metal constituting the piping is desirably one of the above-described metals. However, it is not limited to them; an equivalent or similar material can be employed. Combination with a low-corrosion titanium alloy, tantalum alloy, ceramic, or the like is also possible.

A process whereby an organic modifying agent is added to a water-based solution containing hexagonal ferrite precursor, after which the process of embodiment (2) above is conducted to obtain hexagonal ferrite magnetic particles modified with an organic modifying agent is described above. However, it is also possible to apply the process of embodiment (1) above after adding an organic modifying agent to the water-based solution containing the hexagonal ferrite precursor.

The reaction system in which water is present can be heated to equal to or higher than 300° C. and pressurized to equal to or higher than 20 MPa to put the water in a subcritical to supercritical state to create a reaction site of extremely high reactivity. Placing the hexagonal ferrite precursor in this state can cause the conversion to ferrite to advance rapidly, yielding hexagonal ferrite magnetic particles.

A heating temperature of equal to or higher than 300° C. within the reaction system will suffice, and the heating temperature falling within a range of 350° C. to 500° C. is desirable. The pressure that is applied to the reaction system can be equal to or higher than 20 MPa as set forth above, desirably falling within a range of 20 MPa to 50 MPa.

In one embodiment, the above magnetic powder can contain Al, with at least a part of the Al being present on the surface of the magnetic powder. To make Al adhere to the surface of the magnetic powder, it is possible to apply the above hydrothermal synthesis process. For example, it is possible to make Al adhere to the surface of the hexagonal ferrite magnetic particles by heating and pressurizing a water-based solution containing hexagonal ferrite magnetic particles and an Al compound. To ensure that the Al adhering treatment advances smoothly, the above heating and pressurizing are desirably conducted at a temperature and pressure at which water is in a subcritical to supercritical state. As set forth above, heating a reaction system in which water is present to equal to or higher than 300° C. and pressurizing it to a pressure of equal to or higher than 20 MPa will put the water in a subcritical to supercritical state. Accordingly, the water-based solution containing hexagonal ferrite magnetic particles and an Al compound is desirably heated to equal to or higher than 300° C. and pressurized to a pressure of equal to or higher than 20 MPa. The heating temperature preferably ranges from 350° C. to 500° C. and the pressure applied to the reaction system preferably ranges from 20 MPa to 50 MPa.

The above Al adhering treatment can be conducted in batches or continuously. From the perspective of enhancing productivity, the Al adhering treatment is desirably conducted continuously. It is preferably conducted by continuously feeding the above water-based solution to a reaction flow passage that heats the fluid flowing through it to equal to or higher than 300° C. and applies a pressure of equal to or higher than 20 MPa. One example of a device that is suitable for conducting such a reaction is the manufacturing device described in FIG. 1 above.

An embodiment in which hexagonal ferrite magnetic particles to the surface of which Al adheres by the manufacturing device shown in FIG. 1 are obtained will be described next.

In FIG. 1, water is introduced into liquid tank 1. A solution containing hexagonal ferrite magnetic particles and an Al compound is introduced into liquid tank 2. Water or a mixed solvent of water and an organic solvent are examples of solvents employed in this solution. Examples of organic solvents are the various solvents set forth above that are miscible with water or hydrophilic. From the perspective of smooth progression of the reaction, water is desirably employed as the solvent.

Examples of Al compounds are metal salts such as nitrates, sulfates, and acetates, as well as hydrates and metal alkoxides thereof. Metal salts or hydrates that are highly soluble in water are desirably employed. The quantity of Al compound that is employed can be a quantity that incorporates a desired amount of Al into the magnetic powder being prepared. To achieve smooth progression of the reaction, the quantity of hexagonal ferrite magnetic particles in the above water-based solution is desirably about 0.01 weight part to 10 weight parts per 100 weight parts of solvent.

To inhibit aggregation of hexagonal ferrite magnetic particles in the reaction and make Al adhere to fine particles, it is desirable to add the organic modifying agent set forth above to the solution containing the hexagonal ferrite magnetic particles and the Al compound. The organic modifying agent can be added as is to the solution containing the hexagonal ferrite magnetic particles and the Al compound. Addition in the form of a solution of the organic modifying agent in solvent (organic modifying agent solution) is desirable from the perspective of making Al adhere to fine particles of hexagonal ferrite magnetic particles. For example, the solution containing the hexagonal ferrite magnetic particles and the Al compound can be mixed with the organic modifying agent solution by introducing the organic modifying agent solution into liquid tank 3 in the manufacturing device shown in FIG. 1 and causing pipe 102 to converge with pipe 101. Specific examples of the organic modifying agent, desirable quantities employed, and details regarding solvents that can be used in the organic modifying agent solution are as set forth above.

The following embodiments can be given as specific examples of the process of making Al adhere to the surface of the hexagonal ferrite magnetic particles.

(3) A water-based solution containing hexagonal ferrite magnetic particles and an Al compound, and optionally containing an organic modifying agent, is continuously fed into a reaction flow passage in which the fluid flowing through it is heated to equal to or higher than 300° C. and subjected to a pressure of equal to or higher than 20 MPa to make Al adhere to the surface of the hexagonal ferrite magnetic particles in the reaction flow passage.

(4) A water-based solution containing hexagonal ferrite magnetic particles and an Al compound, and optionally containing an organic modifying agent, is mixed with water that has been heated and pressurized, desirably heated to equal to or higher than 200° C. and pressurized to a pressure of equal to or higher than 20 MPa, after which it is continuously fed into a reaction flow passage in which the fluid flowing through it is heated to equal to or higher than 300° C. and subjected to a pressure of equal to or higher than 20 MPa to make Al adhere to the surface of the hexagonal ferrite magnetic particles in the reaction flow passage.

Embodiment (3) is a process that is similar to embodiment (1) set forth above and embodiment (4) is a process that is similar to embodiment (2) set forth above. For example, it is possible to bring the water-based solution into contact with water that has been heated and pressurized by adding the water-based solution containing hexagonal ferrite magnetic particles and an Al compound to a liquid feed passage to which heated and pressurized water is being continuously fed. Embodiment (4) differs from embodiment (3) in that the heated and pressurized water is brought into contact with the water-based solution containing the hexagonal ferrite magnetic particles and an Al compound, while, in embodiment (3), the water-based solution containing the hexagonal ferrite magnetic particles and an Al compound is heated and pressurized to a subcritical to supercritical state. In embodiment (4), because the Al compound can be instantaneously placed in a highly reactive state by bringing it into contact with heated and pressurized water, the Al adhering treatment can take place sooner, which is advantageous. As set forth above, water generally assumes a highly reactive subcritical to supercritical state when it is heated to equal to or higher than 200° C. and pressurized to equal to or higher than 20 MPa. Accordingly, the heating and pressurizing of water in embodiment (4) are desirably conducted to a temperature of equal to or higher than 200° C. and a pressure of equal to or higher than 20 MPa.

For example, in mixing element M1 in the manufacturing device shown in FIG. 1, water in a subcritical to supercritical state is mixed with a water-based solution containing an Al compound and hexagonal ferrite magnetic particles, and optionally containing an organic modifying agent. The mixed solution is heated and pressurized in reaction flow passage 6 to cause the Al adhering treatment to progress. For example, the Al adhering treatment can take places by placing the Al compound in a highly reactive state to convert it to an oxide of Al (alumina).

A specific embodiment of a continuous hydrothermal synthesis process is as set forth above.

Some specific embodiments of the methods of manufacturing the magnetic powder for magnetic recording according to an aspect of the present invention have been described above. However, the magnetic powder for magnetic recording according to an aspect of the present invention is not limited to that obtained by these manufacturing methods.

Magnetic Recording Medium

A further aspect of the present invention relates to a magnetic recording medium, which comprises a magnetic layer comprising ferromagnetic powder and binder on a nonmagnetic support, wherein the ferromagnetic powder is the magnetic powder according to an aspect of the present invention as set forth above. The magnetic powder according to an aspect of the present invention can afford both a reduced size of particles and a sharp particle size distribution. The magnetic recording medium according to an aspect of the present invention in which such magnetic powder is contained in a magnetic layer is suitable as a magnetic recording medium for high-density recording.

The magnetic recording medium according to an aspect of the present invention will be described in further detail below.

Details of the ferromagnetic powder that is employed in the magnetic layer, and of the method of manufacturing it, are as set forth above.

The magnetic layer contains ferromagnetic powder and binder. Polyurethane resins, polyester resins, polyamide resins, vinyl chloride resins, acrylic resins such as those provided by copolymerizing styrene, acrylonitrile, methyl methacrylate and the like, cellulose resins such as nitrocellulose, epoxy resins, phenoxy resins, polyvinylacetal, polyvinylbutyral, and other polyvinyl alkylal resins can be employed singly, or as mixtures of multiple resins, as the binder contained in the magnetic layer. Among these, desirable resins are polyurethane resin, acrylic resins, cellulose resins, and vinyl chloride resins. These resins can also be employed as binders in the nonmagnetic layer described further below. Reference can be made to paragraphs 0029 to 0031 of Japanese Unexamined Patent Publication (KOKAI) No. 2010-24113, which is expressly incorporated herein by reference in its entirety, with regard to the above binders. Polyisocyanate curing agents can also be employed with the above resins.

Additives can be added as needed to the magnetic layer. Examples of additives are abrasives, lubricants, dispersing agents, dispersion adjuvants, antifungal agents, antistatic agents, oxidation inhibitors, solvents, and carbon black. The additives set forth above can be suitably selected for use from among commercial products based on the properties desired.

Nonmagnetic Layer

The contents of the nonmagnetic layer will be described in detail next. The magnetic recording medium of an aspect of the present invention can comprise a nonmagnetic layer containing nonmagnetic powder and binder between the nonmagnetic support and the magnetic layer. The nonmagnetic powder that is employed in the nonmagnetic layer can be an organic or an inorganic material. Carbon black and the like can also be employed. Examples of inorganic materials are metals, metal oxides, metal carbonates, metal sulfates, metal nitrides, metal carbides, and metal sulfides. Nonmagnetic powders of these materials are available as commercial products and can be manufactured by known methods. For details, reference can be made to Japanese Unexamined Patent Publication (KOKAI) No. 2010-24113, paragraphs 0036 to 0039.

The binders, lubricants, dispersing agents, additives, solvents, dispersion methods, and the like of the magnetic layer are also suitable for use for the nonmagnetic layer. Techniques that are known for magnetic layers can also be applied to the quantity and type of binder, the quantities and types of additives and dispersing agents added, and the like. Carbon black and organic material powders can also be added to the nonmagnetic layer. In this regard, by way of example, reference can be made to Japanese Unexamined Patent Publication (KOKAI) No. 2010-24113, paragraphs 0040 to 0042.

Nonmagnetic Support

Examples of nonmagnetic supports are known supports such as biaxially stretched polyethylene terephthalate, polyethylene naphthalate, polyamide, polyamide-imide, and aromatic polyamide. Among these, polyethylene terephthalate, polyethylene naphthalate, and polyamide are desirable.

These supports can be subjected in advance to corona discharge, plasma treatment, adhesion-enhancing treatment, heat treatment, or the like. The surface roughness of a nonmagnetic support that is suited to use in the present invention is desirably a center average roughness Ra of 3 nm to 10 nm at a cutoff value of 0.25 mm.

Layer Structure

In the thickness structure of the magnetic recording medium according to an aspect of the present invention, the thickness of the nonmagnetic support is desirably 3 μm to 80 μm. The thickness of the magnetic layer can be optimized based on the amount of saturation magnetization of the magnetic head employed, the length of the head gap, and the bandwidth of the recording signal. Generally, it can be 0.01 μm to 0.15 μm, desirably 0.02 μm to 0.12 μm, and preferably, 0.03 μm to 0.10 μm. It suffices for the magnetic layer to be comprised of a least one layer, but it can separated into two or more layers having different magnetic characteristics. The structures of known multilayer magnetic layers can be applied.

The thickness of the nonmagnetic layer is for example 0.1 μm to 3.0 μm, desirably 0.3 μm to 2.0 μm, and preferably 0.5 μm to 1.5 μm. The nonmagnetic layer of a magnetic recording medium according to an aspect of the present invention includes an essentially nonmagnetic layer containing trace quantities of ferromagnetic powder, for example, either as impurities or intentionally, in addition to the nonmagnetic powder. The essentially nonmagnetic layer means a layer exhibiting a residual magnetic flux density of equal to or less than 10 mT, a coercive force of equal to or less than 7.96 kA/m (100 Oe), or a residual magnetic flux density of equal to or less than 10 mT and a coercive force of equal to or less than 7.96 kA/m (100 Oe). The nonmagnetic desirably has no residual magnetic flux density or coercive force.

Backcoat Layer

A backcoat layer can be provided on the opposite surface of the nonmagnetic support from that on which the magnetic layer is present in the magnetic recording medium. The backcoat layer desirably comprises carbon black and inorganic powder. The formula of the magnetic layer and nonmagnetic layer can be applied to the binder and various additives used to form the backcoat layer. The thickness of the back coat layer is desirably equal to or less than 0.9 μm, preferably 0.1 μm to 0.7 μm.

Manufacturing Method

The process of manufacturing the coating liquid for forming the magnetic layer, nonmagnetic layer, or backcoat layer normally comprises at least a kneading step, dispersing step, and mixing steps provided as needed before and after these steps. The various steps can each be divided into two or more steps. All of the starting materials employed in the present invention, such as ferromagnetic powder, nonmagnetic powder, binder, carbon black, abrasives, antistatic agents, lubricants, and solvents, can be added either initially during the step or part way through. Any individual starting material can be divided for addition in two or more steps. For example, polyurethane can be divided up and added during a kneading step, dispersing step, or mixing step following dispersion to adjust the viscosity. In an aspect of the present invention, conventionally known manufacturing techniques can be employed for some of the steps. In the kneading step, it is desirable to employ an apparatus with powerful kneading strength in the kneading step, such as an open kneader, continuous kneader, pressurizing kneader, or extruder. Details on these kneading treatments are described in Japanese Unexamined Patent Publication (KOKAI) Heisei No. 1-106338 and Heisei No. 1-79274, which are expressly incorporated herein by reference in their entirety. Glass beads can also be used to disperse the magnetic layer coating liquid, nonmagnetic layer coating liquid, or backcoat layer coating liquid. High specific gravity dispersing beads in the form of zirconia beads, titania beads, and steel beads are also suitable. The particle diameter and packing rate of these dispersing beads can be optimized for use. A known dispersing apparatus can be employed. For details on methods of manufacturing magnetic recording media, reference can be made to Japanese Unexamined Patent Publication (KOKAI) No. 2010-24113, paragraphs 0051 to 0057, for example.

The magnetic recording medium according to an aspect of the present invention can exhibit excellent electromagnetic characteristics by incorporating the above magnetic powder in a magnetic layer.

EXAMPLES

The present invention will be described in greater detail below through Examples. However, the present invention is not limited to the embodiments shown in Examples. The "parts" and "percent" indicated below denote "weight parts" and "weight percent," respectively. Unless specifically stated otherwise, the steps and evaluations set forth below were conducted in air at 23° C.±1° C.

1. Preparation and Evaluation of the Magnetic Powder for Magnetic Recording

Preparing Magnetic Powder by the Glass Crystallization Method

Example 1

A 1,707 g quantity of $SrCO_3$, 666 g of $H_3BO_3$, 1,348 g of $Fe_2O_3$, 52 g of $Al(OH)_3$, and 57 g $BaCO_3$ were weighed out and mixed in a mixer to obtain a starting material mixture.

The starting material mixture obtained was melted at a melting temperature of 1,380° C. in a platinum crucible. An outflow opening provided in the bottom of the platinum crucible was heated while stirring the melt, and the melt was discharged in rod form at about 6 g/s. The discharged melt was quenched and rolled with a pair of water-cooled rolls to prepare an amorphous material.

A 280 g quantity of the amorphous material obtained was charged to an electric furnace, heated to 635° C. (the crystallization temperature), and maintained for five hours at that temperature to cause hexagonal ferrite particles to precipitate (crystallize).

Next, the crystallized product containing the hexagonal ferrite crystals was coarsely crushed in a mortar. A 1,000 g quantity of 1 mm φ zirconia beads and 800 mL of acetic acid were added. The mixture was dispersed for three hours in a paint shaker. The dispersion was separated from beads and put into a stainless beaker. The dispersion was then processed for 3 hours at 100° C., precipitated in a centrifuge, and repeatedly decanted to clean it. It was then dried for 6 hours at 110° C. to obtain particles.

Example 2

With the exception that the quantity of $BaCO_3$ employed in preparing the starting material mixture was 141 g, the same process was conducted as in Example 1.

Example 3

With the exception that the quantity of $BaCO_3$ employed in preparing the starting material mixture was 76 g, the same process was conducted as in Example 1.

Example 4

With the exception that the quantity of $BaCO_3$ employed in preparing the starting material mixture was 33 g, the same process was conducted as in Example 1.

Comparative Example 1

With the exception that no $BaCO_3$ was employed in preparing the starting material mixture, the same process was conducted as in Example 1.

Comparative Example 2

With the exception that the quantity of $BaCO_3$ employed in preparing the starting material mixture was 166 g, the same process was conducted as in Example 1.

Example 5

With the exception that the quantity of $Al(OH)_3$ employed in preparing the starting material mixture was 13 g, the same process was conducted as in Example 1.

Example 6

With the exception that the quantity of $Al(OH)_3$ employed in preparing the starting material mixture was 35 g, the same process was conducted as in Example 1.

Example 7

With the exception that the quantity of $Al(OH)_3$ employed in preparing the starting material mixture was 95 g, the same process was conducted as in Example 1.

Example 8

With the exception that the quantity of $Al(OH)_3$ employed in preparing the starting material mixture was 6.2 g, the same process was conducted as in Example 1.

Example 9

With the exception that the crystallization temperature was changed to 625° C., the same process was conducted as in Example 1.

Example 10

With the exception that the crystallization temperature was changed to 620° C., the same process was conducted as in Example 1.

Example 11

With the exception that the crystallization temperature was changed to 650° C., the same process was conducted as in Example 1.

Comparative Example 3

With the exception that the crystallization temperature was changed to 660° C., the same process was conducted as in Example 1.

Comparative Example 4

With the exception that the crystallization temperature was changed to 610° C., the same process was conducted as in Example 1.

Example 12

With the exception that 34 g of $CaCO_3$ was added in preparing the starting material mixture, the same process was conducted as in Example 1.

Example 13

With the exception that 238 g of $CaCO_3$ was added in preparing the starting material mixture, the same process was conducted as in Example 1.

Example 14

With the exception that 136 g of $CaCO_3$ was added in preparing the starting material mixture, the same process was conducted as in Example 1.

Example 15

With the exception that 11 g of $CaCO_3$ was added in preparing the starting material mixture, the same process was conducted as in Example 1.

Preparation of Magnetic Powder by Supercritical Synthesis Method

Example 16

(1) Preparation of Precursor Aqueous Solution

In purified water were dissolved strontium nitrate ($Sr(NO_3)_2.4H_2O$), barium nitrate ($Ba(NO_3)_2.4H_2O$, iron (III) nitrate ($Fe(NO_3)_3.9H_2O$), and KOH to prepare an aqueous solution (sol) of metal salts and metal hydroxides. The KOH was added in a quantity that yielded a reaction solution pH of 9. The quantities of the various salts used to prepare the sol were adjusted to achieve a concentration in the aqueous solution (sol) prepared of 0.01 M and a Ba/Fe ratio of 2.0 atomic percent.

(2) Preparation of Modifying Agent Solution

Next, oleic acid was dissolved in ethanol to prepare a modifying agent solution. The concentration of the solution prepared was 0.2 M.

(3) Synthesis of Hexagonal Ferrite

The aqueous solution (sol) was introduced into liquid tank 2 of the manufacturing device shown in FIG. 1 and the modifying agent solution was introduced into liquid tank 3. SUS316BA tube was used as the piping in the manufacturing device.

Purified water that had been introduced into liquid tank 1 was heated by heater 4 while being fed by high pressure pump 5a to cause high-temperature, high-pressure water to flow through pipe 100. In this process, the temperature and the pressure were controlled so that the temperature of the high-temperature, high-pressure water after passing through heating means 4c was 450° C. and the pressure was 30 MPa.

Additionally, the aqueous solution (sol) and modifying agent solution were fed to pipes 101 and 102 using high-pressure pumps 5b and 5c, respectively, at a liquid temperature of 25° C. so that the ratio by volume of aqueous solution:modifying agent solution was 5:5. The two solutions were mixed along the way. The mixed solution obtained was then mixed with the high-temperature, high-pressure water in mixing element M1. Subsequently, it was heated to 400° C. and pressurized to 30 MPa in reaction flow passage 6 to synthesize hexagonal ferrite magnetic particles.

Subsequently, the solution containing the hexagonal ferrite magnetic particles was cooled by cooling water in cooling element 7 and the particles were collected.

The particles that were collected were washed with ethanol and then centrifuged to separate the hexagonal ferrite magnetic particles that had been modified with oleic acid.

(4) Al Adhering Treatment

The following operations were conducted to cause $Al_2O_3$ to precipitate by the supercritical synthesis method on the surface of the hexagonal ferrite magnetic particles obtained by the method set forth above.

Aluminum nitrate 9 hydrate (99.9% purity) was dissolved in pure water to 0.1 M and hexagonal ferrite magnetic particles were admixed to an Al/Fe ratio of 4 atomic percent, yielding a mixed solution.

The mixed solution was introduced into liquid tank 2 of the manufacturing device shown in FIG. 1. The modifying agent solution was introduced into liquid tank 3 in the same manner as in (3) above. SUS316BA tube was employed as piping in the manufacturing device.

Purified water that had been introduced into liquid tank 1 was heated by heater 4 while being fed by high-pressure pump 5a to cause high-temperature, high-pressure water to flow through pipe 100. In this process, the temperature and pressure were controlled so that the temperature of the high-temperature, high-pressure water after passing through heating means 4c was 450° C. and the pressure was 30 MPa.

Additionally, the mixed solution and the modifying agent solution were fed to pipes 101 and 102 at 25° C. by high-pressure pumps 5b and 5c, respectively, so that the ratio by volume of the mixed solution:modifying agent solution was 50:50. The two were mixed along the way. The mixed solution obtained was mixed with the high-temperature, high-pressure water in mixing element M1. Subsequently, it was heated to 450° C. and pressurized to 30 MPa in reaction flow passage 6, yielding hexagonal ferrite magnetic particles to which $Al_2O_3$ adheres. The solution containing the particles was cooled with cold water in cooling element 7 and the particles were collected.

Example 17

With the exception that the quantity of barium nitrate $(Ba(NO_3)_2.4H_2O)$ employed to prepare the precursor aqueous solution was changed so that the Ba/Fe ratio in the aqueous solution (sol) that was prepared was 5.0 atomic percent, the same process was conducted as in Example 16.

Example 18

With the exception that the quantity of barium nitrate $(Ba(NO_3)_2.4H_2O)$ employed to prepare the precursor aqueous solution was changed so that the Ba/Fe ratio in the aqueous solution (sol) that was prepared was 3.5 atomic percent, the same process was conducted as in Example 16.

Example 19

With the exception that the quantity of barium nitrate $(Ba(NO_3)_2.4H_2O)$ employed to prepare the precursor aqueous solution was changed so that the Ba/Fe ratio in the aqueous solution (sol) that was prepared was 1.3 atomic percent, the same process was conducted as in Example 16.

Example 20

With the exception that calcium nitrate $(Ca(NO_3)_2)$ was added so as to achieve a Ca/Fe ratio in the aqueous solution (sol) that was prepared of 0.5 atomic percent, the same process was conducted as in Example 16.

<Evaluation Methods>

(1) X-Ray Diffraction Analysis

When analyzing the particles obtained in Examples and Comparative Examples by X-ray diffraction, all the particles obtained were found to comprise a single phase of M-type hexagonal ferrite.

Examples 16 to 20 were found to exhibit a γ-type $Al_2O_3$ (alumina) peak in addition to an M-type hexagonal ferrite diffraction peak.

In the X-ray diffraction analysis set forth below, CuKα radiation was scanned under conditions of 45 kV and 40 mA and an XRD (X-ray diffraction) pattern was measured. The X-ray diffraction analysis spectra were measured under the following test conditions:

PANalytical X'Pert Pro diffractometer, PIXcel detectors
Voltage 45 kV, intensity 40 mA
Soller slits of incident beam and diffraction beam: 0.017 radians
Fixed angle of dispersion slit: ¼ degree
Mask: 10 mm
Scattering prevention slit: ¼ degree
Measurement mode: continuous
Measurement time per stage: 3 seconds
Measurement rate: 0.017 degree per second
Measurement step: 0.05 degree (2) Composition Analysis by ICP A 0.01 g quantity of the magnetic powder obtained in each of Examples and Comparative Examples was immersed in 10 mL of a 4N—HCl solution and dissolved by heating for 3 hours at 80° C. on a hot plate. The solution was diluted and then subjected to elemental analysis with an inductively coupled plasma (ICP) analysis device. The ratios of the various elements were determined from the results.

(3) Measuring the Average Plate Diameter, Coefficient of Variation in Particle Size The average particle size (average plate diameter) and the coefficient of variation in particle size of the magnetic powders obtained in Examples and Comparative Examples was determined by the method set forth above.

(4) Measurement of Saturation Magnetization σs

The saturation magnetization σs of each of the magnetic powders obtained in Examples and Comparative Examples was measured at a field strength of 1,194 kA/m (15 kOe) with a vibrating sample magnetometer (made by Toei-Kogyo Co. Ltd.).

(5) Measurement of Anisotropy Constant Ku

Measurement was conducted at magnetic field sweep rates in the Hc measurement element of 3 minutes and 30 minutes with a vibrating sample magnetometer (made by Toei-Kogyo Co. Ltd.), and anisotropy constant Ku was calculated from the relational equation of He and magnetization reversal volume due to thermal fluctuation given below. In the table given further below, Ku is given in units of erg/cc. The values indicated in the table can be converted to the SI unit system based on the conversion equation, 1 erg/cc=$10^{-1}$ J/m$^3$.

$$He=2Ku/Ms(1-[(KuT/kV)\ln(At/0.693)]^{1/2})$$

(In the equation, Ku: anisotropy constant; Ms: saturation magnetization; k: Boltzmann constant; T: absolute temperature; V: activation volume; A: spin precession frequency; t: magnetic field reversal time.)

(6) Confirming the State of the Al

Observation of the cross-sections of particles of the magnetic powder prepared in Examples 1 to 15 by high-resolution TEM revealed the formation of a coating on the outer surface thereof.

Further, in analysis of the magnetic powders prepared in Examples 1 to 15 by X-ray photoemission spectroscopy (XPS), measurement of the Al/Fe ratio at a depth of about 0.5 nm from the particle surface revealed a value of 1.5 to 2.0-fold the value measured by ICP in (2) above, confirming the localization of Al in the outer layer.

Based on the above results, the presence of a coating of Al on the surface of the particles was confirmed for the magnetic powder prepared in Examples 1 to 15. The above TEM observation revealed the formation of a coating on primary particles in the magnetic powders obtained in Examples 1 to 15.

2. Preparation and Evaluation of a Magnetic Recording Medium (Magnetic Tape)

Magnetic tapes were prepared by the following method using the magnetic powder prepared in Examples and Comparative Examples.

(1) Formula of Magnetic Layer Coating Liquid

TABLE 1

| | Synthesis metod | Ba/Fe at % | Ba/(Sr + Ba) at % | Ca/Fe at % | Ba/(Sr + Ba + Ca) at % | Al/Fe at % | Average particle size nm |
|---|---|---|---|---|---|---|---|
| Ex. 1 | Glass crystallization method | 1.9 | 13 | — | — | 4.2 | 20 |
| Ex. 2 | Glass crystallization method | 4.8 | 33 | — | — | 4.1 | 21 |
| Ex. 3 | Glass crystallization method | 3.3 | 23 | — | — | 4.2 | 20 |
| Ex. 4 | Glass crystallization method | 1.2 | 8 | — | — | 4.0 | 18 |
| Comp. Ex. 1 | Glass crystallization method | 0.4 | 4 | — | — | 4.7 | 16 |
| Comp. Ex. 2 | Glass crystallization method | 5.5 | 42 | — | — | 4.3 | 23 |
| Ex. 5 | Glass crystallization method | 1.9 | 13 | — | — | 1.0 | 19 |
| Ex. 6 | Glass crystallization method | 1.9 | 13 | — | — | 2.8 | 21 |
| Ex. 7 | Glass crystallization method | 1.9 | 13 | — | — | 7.8 | 22 |
| Ex. 8 | Glass crystallization method | 1.9 | 13 | — | — | 0.4 | 18 |
| Ex. 9 | Glass crystallization method | 1.9 | 13 | — | — | 4.1 | 17 |
| Ex. 10 | Glass crystallization method | 1.9 | 13 | — | — | 4.2 | 17 |
| Ex. 11 | Glass crystallization method | 1.9 | 13 | — | — | 4.1 | 23 |
| Comp. Ex. 3 | Glass crystallization method | 1.9 | 13 | — | — | 4.3 | 28 |
| Comp. Ex. 4 | Glass crystallization method | 1.9 | 13 | — | — | 4.1 | 9 |
| Ex. 12 | Glass crystallization method | 1.9 | 14 | 0.4 | 4 | 4.1 | 20 |
| Ex. 13 | Glass crystallization method | 1.9 | 16 | 2.8 | 18 | 4.0 | 19 |
| Ex. 14 | Glass crystallization method | 1.9 | 13 | 1.5 | 16 | 4.2 | 18 |
| Ex. 15 | Glass crystallization method | 1.9 | 13 | 0.08 | 1 | 4.3 | 20 |
| Ex. 16 | Supercritical synthesis method | 1.9 | 13 | — | — | 3.9 | 14 |
| Ex. 17 | Supercritical synthesis method | 4.7 | 30 | — | — | 3.9 | 14 |
| Ex. 18 | Supercritical synthesis method | 3.2 | 20 | — | — | 3.5 | 14 |
| Ex. 19 | Supercritical synthesis method | 1.1 | 8 | — | — | 3.6 | 15 |
| Ex. 20 | Supercritical synthesis method | 1.9 | 13 | 0.4 | 4 | 3.6 | 14 |

| | Coefficient of variation in particle size % | Crystalline structure | σs Am$^2$/kg | Ku*10E6 erg/cc | SNR dB |
|---|---|---|---|---|---|
| Ex. 1 | 23 | Magnetoplumbite structure | 44 | 1.8 | +1.0 |
| Ex. 2 | 20 | Magnetoplumbite structure | 44 | 1.6 | +1.1 |
| Ex. 3 | 25 | Magnetoplumbite structure | 44 | 1.7 | +1.1 |
| Ex. 4 | 26 | Magnetoplumbite structure | 45 | 1.8 | +0.9 |
| Comp. Ex. 1 | 33 | Magnetoplumbite structure | 45 | 1.8 | ±0.0 |
| Comp. Ex. 2 | 20 | Magnetoplumbite structure | 40 | 1.5 | −0.5 |
| Ex. 5 | 24 | Magnetoplumbite structure | 48 | 1.7 | +1.3 |
| Ex. 6 | 24 | Magnetoplumbite structure | 46 | 1.8 | +1.2 |
| Ex. 7 | 21 | Magnetoplumbite structure | 38 | 2.0 | +0.1 |
| Ex. 8 | 24 | Magnetoplumbite structure | 49 | 2.0 | +0.2 |
| Ex. 9 | 22 | Magnetoplumbite structure | 44 | 1.8 | +1.3 |
| Ex. 10 | 22 | Magnetoplumbite structure | 44 | 1.8 | +1.4 |
| Ex. 11 | 19 | Magnetoplumbite structure | 49 | 2.0 | +0.7 |
| Comp. Ex. 3 | 17 | Maenetoplumbite structure | 53 | 2.1 | −0.3 |
| Comp. Ex. 4 | 34 | Magnetoplumbite structure | 30 | 1.4 | −1.0 |
| Ex. 12 | 24 | Magnetoplumbite structure | 50 | 2.0 | +1.3 |
| Ex. 13 | 25 | Magnetoplumbite structure | 52 | 2.1 | +1.5 |
| Ex. 14 | 25 | Magnetoplumbite structure | 51 | 2.0 | +1.5 |
| Ex. 15 | 23 | Magnetoplumbite structure | 50 | 1.9 | +1.3 |

TABLE 1-continued

| Ex. 16 | 16 | Magnetoplumbite structure, Al$_2$O$_3$ | 49 | 2.1 | +1.3 |
| Ex. 17 | 18 | Magnetoplumbite structure, Al$_2$O$_3$ | 48 | 2.0 | +1.5 |
| Ex. 18 | 18 | Magnetoplumbite structure, Al$_2$O$_3$ | 48 | 2.0 | +1.2 |
| Ex. 19 | 16 | Magnetoplumbite structure, Al$_2$O$_3$ | 50 | 2.0 | +0.8 |
| Ex. 20 | — | Magnetoplumbite structure, Al$_2$O$_3$ | 53 | 2.2 | +1.6 |

(3) Preparation of Magnetic Tape

For each of the various coating liquids set forth above, the various components were kneaded in a kneader. The liquid was passed by pump through a sand mill in which had been introduced a quantity of 1.0 mm φ zirconia beads that filled 65 percent of the volume of the dispersion part and dispersing process was conducted for 120 minutes (the period of actual residence in the dispersion part) at 2,000 rpm. To the dispersion obtained were added 6.5 parts of polyisocyanate in the case of the nonmagnetic layer coating liquid. Another 7 parts of methyl ethyl ketone were added. The mixture was filtered with a filter having an average pore diameter of 1 μm to prepare a coating liquid for forming a nonmagnetic layer and a coating liquid for forming a magnetic layer.

The nonmagnetic layer coating liquid obtained was coated and dried to a thickness of 1.0 μm on a polyethylene naphthalate base 5 μm in thickness, followed by a magnetic layer 70 nm in thickness in sequential multilayer coating. After drying, the product was processed at a linear pressure of 300 kg/cm at a temperature of 90° C. in a seven-stage calender. The product was slit to a width of ¼ inch and the surface was polished to obtain a magnetic tape.

<Evaluation Methods>
Evaluation of SNR

A recording head (MIG, gap 0.15 μm, 1.8 T) and a reproduction GMR head were mounted on a drum tester, signals were recorded at a track density of 16 KTPI and a linear recording density of 400 Kbpi (surface recording density of 6.4 Gbpsi), and the reproduction output, noise, and SNR of each of the magnetic tapes were measured. The value measured for Comparative Example 1 was employed as a reference.

The results of the above are given in the following table.

| | |
|---|---|
| Hexagonal ferrite magnetic powder: | 100 parts |
| Polyurethane resin: | 12 parts |
|   Weight average molecular weight: 10,000 | |
|   Content of sulfonic acid functional groups: 0.5 meq/g | |
| Diamond particles (50 nm average particle diameter): | 2 parts |
| Carbon black (#55, made by Asahi Carbon, particles size 0.015 μm): | 0.5 part |
| Stearic acid: | 0.5 part |
| Butyl stearate: | 2 parts |
| Methyl ethyl ketone: | 180 parts |
| Cyclohexanone: | 100 parts |
| (2) Nonmagnetic layer coating liquid | |
| Nonmagnetic powder: α-iron oxide: | 100 parts |
|   Average primary particle diameter: 0.09 μm | |
|   Specific surface area by BET method: 50 m$^2$/g | |
|   pH: 7 | |
|   DBP oil absorption capacity: 27 to 38 g/100 g | |
|   Surface treatment agent Al$_2$O$_3$: 8 weight percent | |
| Carbon black (Conductex SC-U made by Columbia Carbon): | 25 parts |
| Vinyl chloride copolymer (MR104, made by Zeon Corporation): | 13 parts |
| Polyurethane resin (UR8200, made by Toyobo): | 5 parts |
| Phenyl phosphonic acid: | 3.5 parts |
| Butyl stearate: | 1 part |
| Stearic acid: | 2 parts |
| Methyl ethyl ketone: | 205 parts |
| Cyclohexanone: | 135 parts |

Evaluation Results

As shown in Table 1, the magnetic powders of Examples contained fine particles and exhibited sharp particle size distributions. Magnetic tapes prepared using these magnetic powders exhibited high electromagnetic characteristics (SNR).

The magnetic powders that contained a prescribed quantity of Ca in addition to Ba (Examples 12 to 15, Example 20) exhibited high Ku and σs values.

Based on the above results, an aspect of the present invention was found to provide magnetic powders for magnetic recording that were comprised of fine particles, exhibited good uniformity of particle size, and were suited to higher density recording.

An aspect of the present invention is useful in the field of manufacturing magnetic recording media for high-density recording.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. Magnetic powder, which is magnetoplumbite hexagonal strontium ferrite magnetic powder comprising 1.1 atomic percent to 4.8 atomic percent of Ba per 100 atomic percent of Fe, the average particle size of which ranges from 10 nm to 25 nm, and which is magnetic powder for magnetic recording, wherein the content of Ba is from 8 atomic percent to 33 atomic percent per 100 atomic percent of the combined content of Sr and Ba.

2. The magnetic powder according to claim 1, which further comprises Al.

3. The magnetic powder according to claim 2, wherein the content of Al per 100 atomic percent of Fe ranges from 0.5 atomic percent to 6 atomic percent.

4. The magnetic powder according to claim 2, wherein at least a part of the Al is present on a surface of the magnetic powder.

5. The magnetic powder according to claim 1, which further comprises Ca.

6. The magnetic powder according to claim 5, wherein the content of Ca per 100 atomic percent of the combined content of Sr, Ca, and Ba ranges from 1 atomic percent to 20 atomic percent.

7. The magnetic powder according to claim 1, which comprises 0.5 atomic percent to 6 atomic percent of Al per 100 atomic percent of Fe and 1 atomic percent to 20 atomic percent of Ca per 100 atomic percent of the combined content of Sr, Ca, and Ba.

8. The magnetic powder according to claim 7, wherein at least a part of the Al is present on a surface of the magnetic powder.

9. A magnetic recording medium, which comprises a magnetic layer comprising ferromagnetic powder and binder on a nonmagnetic support, wherein the ferromagnetic powder is the magnetic powder according to claim 1.

* * * * *